(12) United States Patent
Wetzig

(10) Patent No.: US 7,422,627 B2
(45) Date of Patent: Sep. 9, 2008

(54) GAS TRANSMITTER WITH SELECTIVE GAS PERMEABLE SURFACES

(75) Inventor: Daniel Wetzig, Cologne (DE)

(73) Assignee: Inficon GmbH (DE)

( * ) Notice: Subject to any disclaimer, the term of this patent is extended or adjusted under 35 U.S.C. 154(b) by 500 days.

(21) Appl. No.: 10/497,398

(22) PCT Filed: Nov. 14, 2002

(86) PCT No.: PCT/EP02/12718

§ 371 (c)(1),
(2), (4) Date: Jun. 14, 2005

(87) PCT Pub. No.: WO03/052371

PCT Pub. Date: Jun. 26, 2003

(65) Prior Publication Data

US 2005/0229786 A1    Oct. 20, 2005

(30) Foreign Application Priority Data

Dec. 18, 2001 (DE) .................... 101 62 126

(51) Int. Cl.
*B01D 53/22* (2006.01)
(52) U.S. Cl. .............. 96/4; 96/11; 95/45; 95/53; 73/863.11; 73/863.23

(58) Field of Classification Search ............. 96/4, 96/7, 11, 12, 13, 14; 95/45, 53; 73/31.06, 73/863, 863.03, 863.11, 863.23, 864.91; 361/103

See application file for complete search history.

(56) References Cited

U.S. PATENT DOCUMENTS

| 6,277,177 | B1 * | 8/2001 | Bley et al. .................. 96/4 |
| 6,541,676 | B1 * | 4/2003 | Franz et al. ................ 96/11 |
| 7,201,831 | B2 * | 4/2007 | Vincent ................... 204/416 |
| 2003/0179530 | A1 * | 9/2003 | Neubert et al. ............ 361/103 |
| 2005/0050944 | A1 * | 3/2005 | Ha et al. .................. 73/31.06 |
| 2005/0142034 | A1 * | 6/2005 | Kim et al. ................ 422/82.02 |

FOREIGN PATENT DOCUMENTS

| DE | 195 21 275 A1 | 12/1996 |
| DE | 100 19 287 A1 * | 10/2001 |
| WO | 96/41677 | 12/1996 |

* cited by examiner

*Primary Examiner*—Jason M Greene
(74) *Attorney, Agent, or Firm*—Marjama Muldoon Blasiak & Sullivan LLP

(57) ABSTRACT

A gas transmitter having selective gas permeable surfaces includes a support disc that is provided with a plurality of through openings. The support disc is made from a semiconductor material. The transmitter further includes a membrane covering the openings in the support disc thereby forming the selective gas permeable surfaces and further controls the temperature of the membrane.

8 Claims, 2 Drawing Sheets

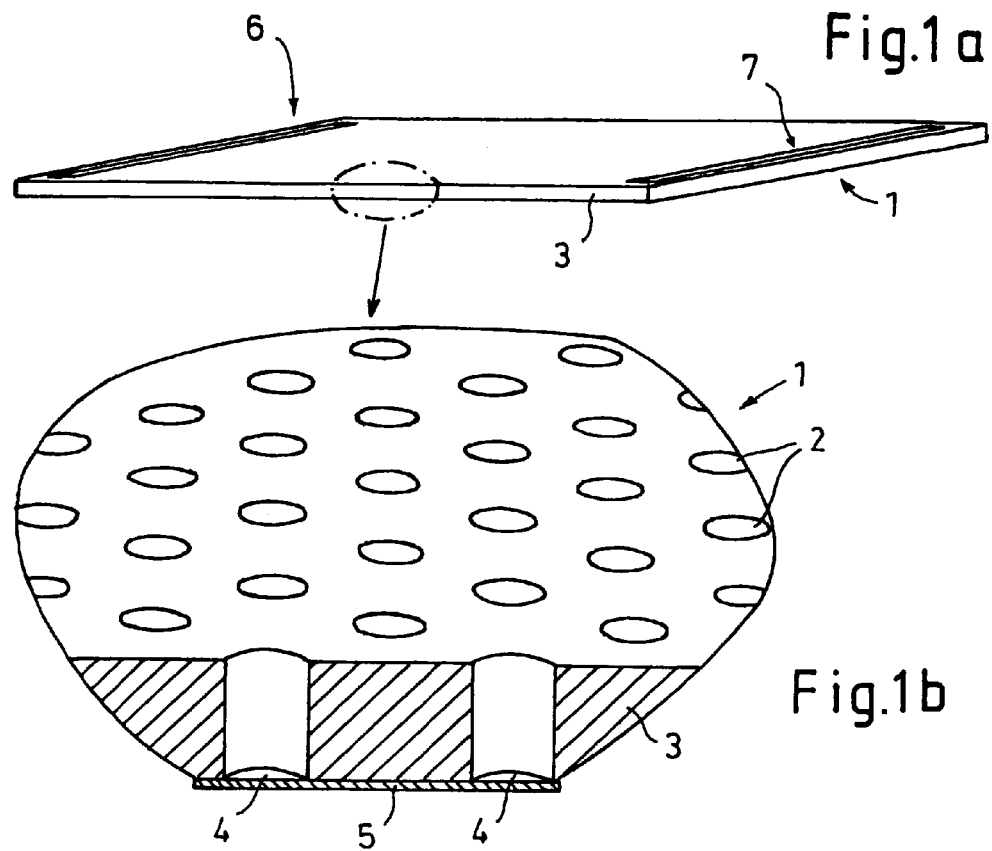
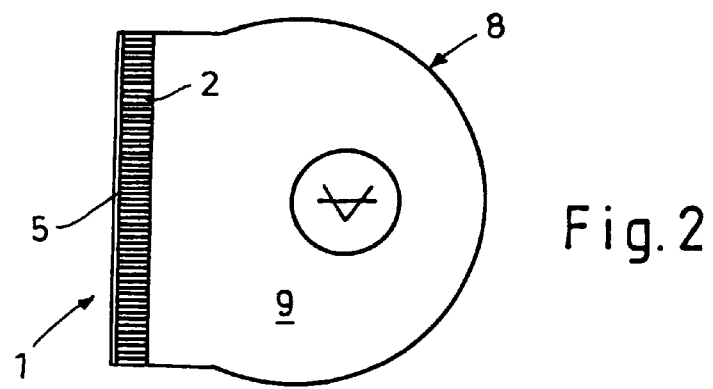

US 7,422,627 B2

GAS TRANSMITTER WITH SELECTIVE GAS PERMEABLE SURFACES

FIELD OF THE INVENTION

The invention relates to a gas transmitter with selective gas permeable surfaces.

BACKGROUND OF THE INVENTION

A gas transmitter of this kind is employed in measuring or analytical instruments. It shall be achieved, for example, that light gases are admitted into a measuring or analytical instrument in a preferred manner whereby heavier gases enter in a less preferred manner. The permeability of the membrane for lighter gases is known to be temperature dependent. For the purpose of utilizing this—for example, for controlling the permeability—the membrane needs to be equipped with a heater.

From WO 96/41 677, a gas transmitter of the here affected kind is known. In order to heat the gas permeable surfaces, each of the multitude of permeable surfaces is equipped with a heating filament. The heating filaments are applied by means of methods from the area of thin-film technology (for example, vacuum coating or evaporation methods, photographic lithography, etching). Moreover, the heating filaments need to be electrically contacted for inclusion within an electric circuit. Also the current feed lines leading to each of the filaments need to be applied to the membrane by reliance on the aforementioned coating methods. In all, equipping gas transmitters with heating means is according to the state-of-the-art extremely involved. Finally, the heating filaments have the disadvantage that they cover relatively large areas of the active gas permeation surfaces.

SUMMARY OF THE INVENTION

It is the task of the present invention to render the design of a gas transmitter of the here affected kind significantly more simple with respect to its equipping with temperature control means for its gas permeable surfaces.

This task is solved through the present invention in that the support disc itself serves as a means for controlling the temperature of the membrane. Through the present invention it is possible to dispense with additional production steps which according to the state-of-the-art are required for equipping the transmitters with temperature control means. Moreover, the gas permeable surfaces are free of heating filaments impairing the permeation of the gases.

A commercially available silicon wafer is expediently employed as the support disc. Support discs made of other materials having the properties of a semiconductor (for example, germanium, diamond etc.) may also be employed.

The membrane consists expediently of quartz, quartz glass or similar materials, for example, Pyrex ™glass. However, usable are also membranes with selectively acting properties made of a polymer, for example, FEP as is known from DE-A-43 26 267.

Further advantages and details of the present invention shall be explained with reference to the examples of embodiments depicted in the 4-following drawings.

BRIEF DESCRIPTION OF THE DRAWINGS

FIGS. 1a, 1b a gas transmitter according to the present invention; and

FIGS. 2 and 3 schematically represent instruments, each having a gas transmitter according to the present invention.

DETAILED DESCRIPTION

Figure 3:
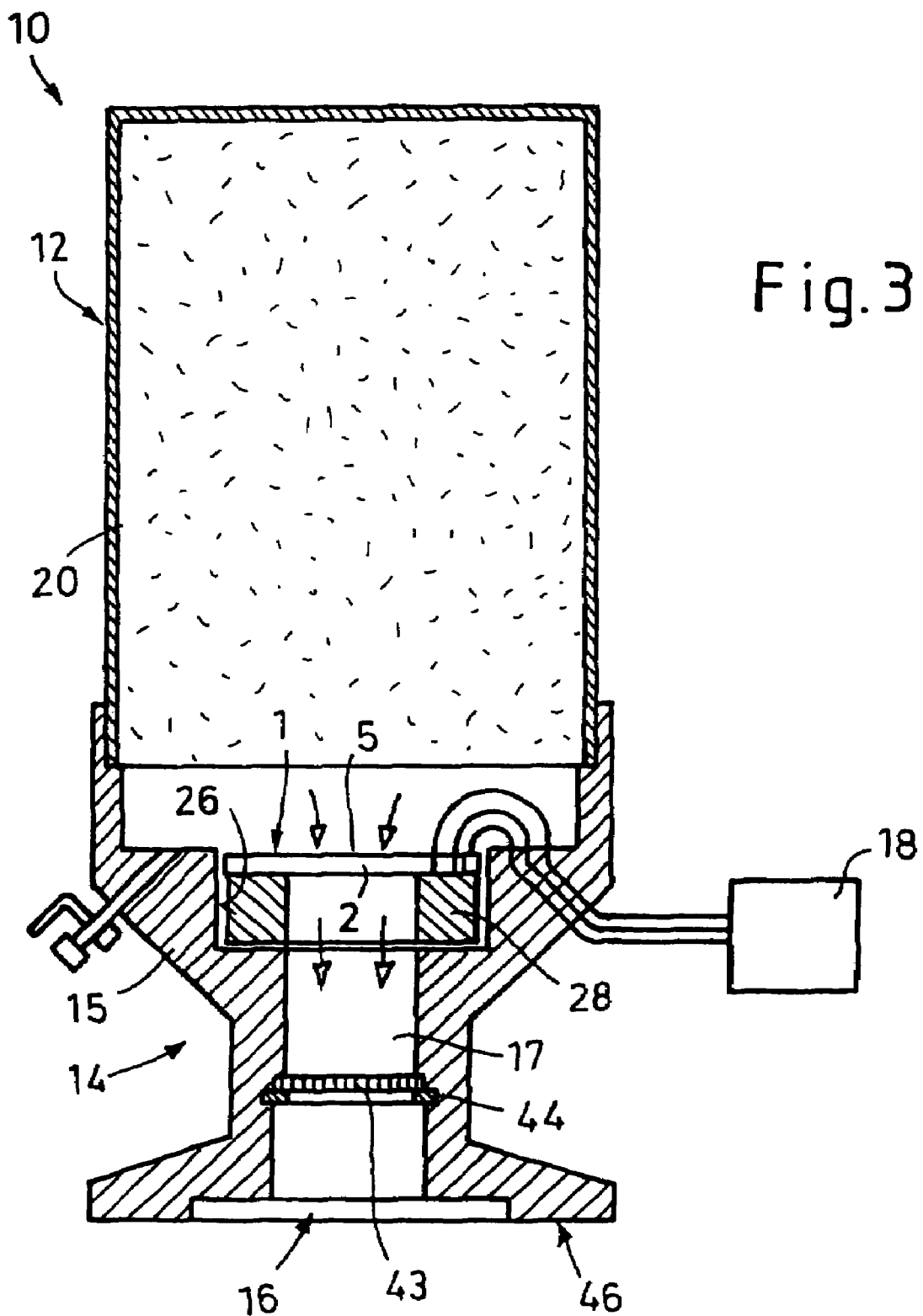

In the drawing figures the gas transmitter is designated as 1, the support disc, equipped with a multitude of transmission openings 2 (FIG. 1b), is designated as 3, and the membrane forming the permeable surfaces 4 covering the gas transmission openings 2 in the support disc is designated as 5 (FIG. 1b).

FIG. 1a is a partly enlarged view of a section of the gas transmitter 1, partly by way of a sectional view, partly by way of a top view. Only this illustration makes apparent the transmission openings 2, the membrane 5 as well as two of the gas permeation surfaces 4. The thickness of the support disc 3 is in the order of magnitude of 0.6 mm; the thickness of the membrane 5 amounts to approximately 6 µm.

According to the idea on which the present invention is based, the support disc 3 itself is employed as a resistance heater. To this end it is equipped in the area of opposing sides with metallic electrodes 6, 7 which are expediently applied by evaporation coating. The voltage required for producing the heating current is applied to these electrodes. Electrodes of this type are not absolutely required; in the case of simpler solutions also contact clips may be employed.

At room temperature the specific resistance of standard silicon discs amounts to approximately 20 MOhm×cm. At a voltage of 1 kV, a heating current of approximately 3 µA is produced in a disc having a size of 1 cm×1 cm×625 µm, this being equivalent to an electric heating power of 3 mW. Through this heating power the wafer is slightly warmed thereby reducing the specific resistance of the semiconductor material, so that the heating current, respectively the heating power increases for the same voltage. At a temperature of T=380° C. the specific resistance amounts to approximately 3.8 Ohm×cm. The specific resistance thus decreases by seven orders of magnitude when increasing the temperature by 360° C. Thus there exists the possibility of being able to precisely control the temperature through the electric current.

In FIG. 2 a leakage gas detector 8 serves as an example for an instrument in which the gas transmitter 1 in accordance with the present invention is employed. A leakage gas detector of this kind is basically known from DE-A-43 26 265. Leaking gas, for example, helium entering through the gas transmitter 1 is detected through the pressure increase in the closed chamber 9 behind the gas transmitter 1. In accordance with the present invention, the support disc 3 serves as a resistance heater for the membrane 5, the permeability of which increases for lighter gases at increasing temperatures. After the formation of a signal, the heater may be switched off, for example for preventing the entry of unnecessarily large quantities of helium into the detector system. Practically, the detector 8 presented is a pressure gauge, this being expressed through the depicted symbol.

FIG. 3 depicts a controllable calibrated leak 10 of a design as already described in German patent application 101 22 733.7. It substantially consists of a test gas reservoir 12, a base 14 with a test gas outlet 16 and a control facility 18.

The test gas reservoir 12 is formed by a gas-tight pot-shaped reservoir vessel 20 being inserted with the opening pointing down in a gas-tight manner into the upper section of the base 14.

The metal base body of the base 14 exhibits an axially vertically extending outlet channel 17 forming the test gas outlet 16. Embedded at the end of the outlet channel 17 on the side of the reservoir vessel is an annular step-like shoulder 26 in the base body 15, said shoulder supporting the gas transmitter 1 on an annular insulation body 28.

In the axial center area of outlet channel 17, a filter disc 43 with a securing ring 44 is arranged for the purpose of providing a means of mechanical protection, said filter disc preventing the entry of particles into the sensitive analytical instrument downstream.

On the outlet side of the base 14, a mounting flange 46 is provided serving the purpose of being able to easily mount the test leak facility 10 to an adjacent element.

The insulation body 28 consists of a heat and gas resistant material with good heat insulating properties—and insulated the gas transmitter 1 thermally with respect to the base body 15. Thus the dissipation of heat into the base 14 is reduced to a minimum so that the amount of heating energy required for maintaining a certain temperature is as low as possible. For the purpose of implementing high modulation frequencies the insulation body 28, however, may consist of a material with good heat conducting properties.

With the calibrated leak facility detailed, leakage rates of $10^{-11}$ to $10^{-4}$ mbar x|x s$^{-1}$ can be implemented.

The described calibrated leak facility 10 represents on the one hand a source of test gas capable of being precisely adjusted and controlled across a wide range of leakage rates and is simultaneously highly reliable, since the possibility of blocking the outlet channel 17 or the gas transmitter 1 is practically excluded.

What is claimed is:

1. A gas transmitter with selective gas permeable surfaces comprising:
    a support disc having a plurality of through openings, said disc being made at least mostly from silicon;
    a membrane made of a material selected from at least one of the group consisting of quartz, quartz glass and PYREX™ glass and covering said openings in said support disc, thereby forming selective gas permeable surfaces; and
    means for controlling a temperature of said membrane wherein said support disc is equipped in areas substantially facing each other with electrodes and serves as a resistance heater and a means for controlling said temperature of said membrane.

2. A gas transmitter according to claim 1, wherein said transmitter is part of a leakage gas detector.

3. A gas transmitter according to claim 1, wherein said transmitter is of a controllable calibrated leak.

4. A gas transmitter according to claim 3, wherein said controllable calibrated leak is for helium.

5. A gas transmitter with selective gas permeable surfaces comprising:
    a support disc having a plurality of through openings, said disc being made at least mostly from silicon;
    a membrane made from a polymer and covering said openings in said support disc, thereby forming selective gas permeable surfaces; and
    means for controlling a temperature of said membrane wherein said support disc is equipped in areas substantially facing each other with electrodes and serves as a resistance heater and a means for controlling said temperature of said membrane.

6. A gas transmitter according to claim 5, wherein said transmitter is part of a leakage gas detector.

7. A gas transmitter according to claim 5, wherein said transmitter is part of a controllable calibrated leak.

8. A gas transmitter according to claim 7, wherein said controllable calibrated leak is for helium.

* * * * *

UNITED STATES PATENT AND TRADEMARK OFFICE
CERTIFICATE OF CORRECTION

| | | |
|---|---|---|
| PATENT NO. | : 7,422,627 B2 | Page 1 of 1 |
| APPLICATION NO. | : 10/497398 | |
| DATED | : September 9, 2008 | |
| INVENTOR(S) | : Daniel Wetzig | |

It is certified that error appears in the above-identified patent and that said Letters Patent is hereby corrected as shown below:

Column 1, line 56, change "Pyrex™" to --PYREX™--.

Column 1, line 62, delete "in the 4- following drawings" and replace with --in the following drawings--.

Column 1, line 66, delete "FIGS. 1a, 1b a gas transmitter" and replace with --FIGS. 1a and 1b depict a gas transmitter--.

Column 2, line 42, delete "In Fig. 2 a leakage" and replace with --In Fig. 2, a leakage--.

In Claim 3, column 4, line 12, delete "transmitter of a" and replace with --transmitter is part of a--.

Signed and Sealed this

Sixteenth Day of December, 2008

JON W. DUDAS
*Director of the United States Patent and Trademark Office*